June 16, 1964    J. J. BIKERMAN    3,137,594
ELECTRODE FOR ELECTRIC BATTERIES
Filed May 19, 1960

INVENTOR:
JACOB J. BIKERMAN
BY
AGENT

United States Patent Office

3,137,594
Patented June 16, 1964

3,137,594
ELECTRODE FOR ELECTRIC BATTERIES
Jacob Joseph Bikerman, Cambridge, Mass., assignor to Yardney International Corp., New York, N.Y., a corporation of New York
Filed May 19, 1960, Ser. No. 30,339
5 Claims. (Cl. 136—30)

My present invention relates to electrodes for electrochemical batteries, more particularly to negative electrodes for batteries (rechargeable or other) of the alkaline type. This application is a continuation-in-part of applications S.N. 309,829, filed September 16, 1952, now Patent 2,810,008, and 673,468, filed July 22, 1957, now abandoned.

In such batteries, which may comprise negative electrodes containing zinc and positive electrodes containing silver as disclosed, for example, in U.S. Patents Nos. 2,594,709 to 2,594,714, issued April 29, 1952, to Henri Georges André, it has been found that the decrease in terminal voltage experienced during prolonged discharge are due chiefly to polarization of the negative electrode, whereas the voltage drop due to internal cell resistance and polarization of the positive electrode is only of subordinate importance. It is also known that this polarization is a function not of the absolute current but of the apparent current density at the electrode.

It is, accordingly an important object of my present invention to provide means for reducing the apparent current density at the negative electrode (or electrodes) of a battery of the above-described type by increasing the effective surface of such electrode.

In the case of batteries which are to be operated at low temperatures, e.g. at —30° C., polarization at a negative electrode containing zinc as its active material is often found to be sharply increased because of the sluggishness with which a film of zinc oxide and/or hydroxide, formed at the interface of the electrode material and the electrolyte, goes into solution. It has further been found that a high internal cell pressure, created by the swelling of the separator material in the electrolyte in accordance with the teachings of the aforementioned André patents, is conducive to rapid polarization at both electrodes during low-temperature operation, presumably because electrolytic diffusion through the separator is greatly impeded under such conditions. If, on the other hand, the electrode assembly is initially packed more loosely to avoid excessive compression, adequate and uniform contact between the electrodes and the separator layers is difficult to achieve over a range of varying operating temperatures as the electrolyte gradually heats up on account of the passage of current.

A more particular object of my invention, therefore, is to provide an electrolyte structure which is particularly adapted for use at temperatures below the freezing point of water.

I have found that these objects can be realized by the provision of means in the active electrode material serving the following functions:

(a) To provide a support for the active material so as to prevent same from gravitating to the bottom of the surrounding container;

(b) To maintain the conductivity of the electrode mass substantially independent of the state of charge of the battery;

(c) To form discontinuities in the electrolyte body adapted to break up the aforementioned film of zinc compounds;

(d) To confer upon the electrode a certain elasticity in order to insure satisfactory contact with reduced internal pressure.

The means satisfying the above requirements are constituted, in accordance with this invention, by a multiplicity of flat strips of ribbons of highly conductive metal, such as copper or silver turnings, randomly scattered through a body of compacted comminuted active material consisting of zinc and/or zinc compounds.

It has been observed that alkaline batteries having negative electrodes incorporating structures of the character just described will manifest greatly improved performance particularly at low temperatures, e.g. at temperatures of —30° C.

The above and other objects, features and advantages of my invention will become more fully apparent from the following description of certain embodiments, reference being had to the accompanying drawing in which.

Figures 1, 2:
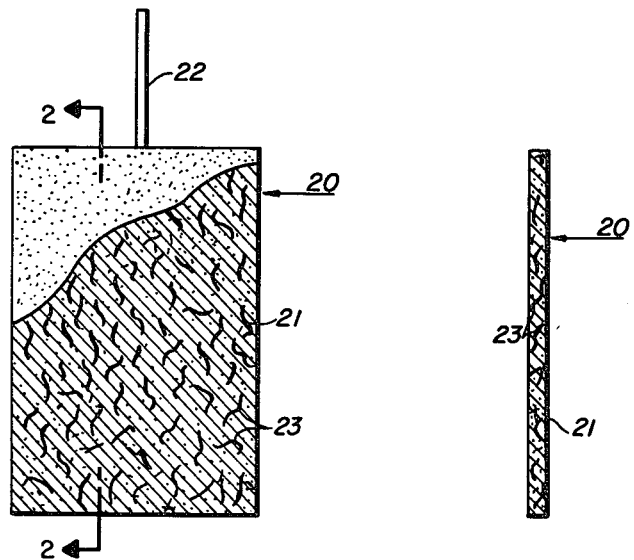
FIG. 1 is elevational view, partly in section, of an electrode incorporating a structure according to the invention.
FIG. 2 is a section on the line 2—2 of FIG. 1.

In FIGS. 1 and 2 there is shown an electrode generally designated 20 and comprising a body 21 of compacted active material, e.g. zinc oxide, in powder form.

A large number of relatively short fragments 23 are scattered in random fashion throughout the electrode body 21. These ribbon-shaped fragments, which may be turnings or shavings of a highly conductive metal such as silver or copper, contribute to the mechanical support of the body 21 of zinc-oxide particles. Each of the conductive elements 23 moreover represents, in effect, a miniature spring adapted to resist torsional as well as flexional deformations; thus the electrode 20 will act as a resilient cushion or pad adapted to exert a certain pressure upon the inter-electrode separator material to insure adequate contact between the elements of the electrode assembly and equalize the internal cell pressure. Terminal lead 22 emerging from the electrode 20 may be round or flat and may or may not be in direct mechanical contact with some of the conductive elements 23. The thickness of electrode 20 is exaggerated in FIG. 2.

Figure 3:
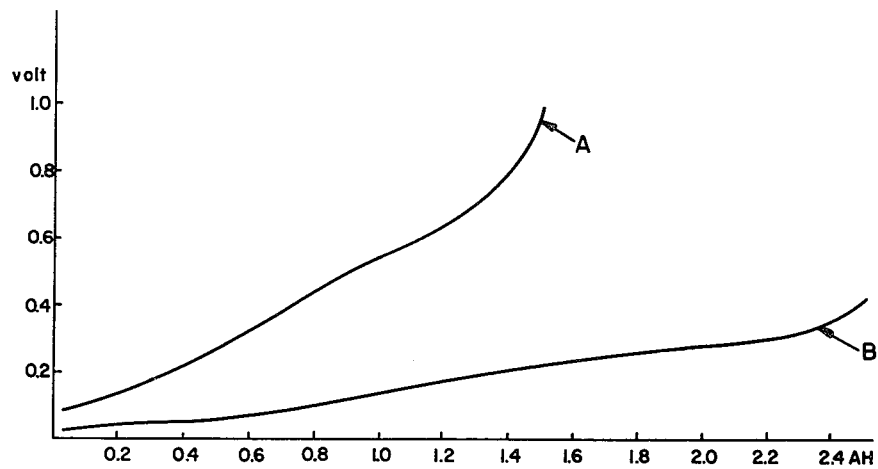
FIG. 3 is a set of graphs illustrative of the improvement realized by the present invention.

FIG. 3 shows graphs relating to the performances of alkaline silver-zinc batteries, of the general type disclosed in FIG. 5 of André Patent No. 2,594,713, with conventional negative electrodes and with electrodes of equal capacity of the type herein disclosed. The particular batteries used in these tests consisted of five negative electrodes alternating with four positive electrodes of sintered silver powder, separated by cellophane layers, in an electrolyte of 44% KOH. Each negative electrode consisted, essentially, of zinc-oxide powder (in the uncharged state) of 3.5 grams total weight, with the addition of 1.1 grams of copper turnings per negative electrode in the case of test cells embodying the invention. The copper turnings were of the usual type as obtained in the machining of a copper cylinder on a lathe, with a thickness of about 0.2 mm., a width of approximately 2 to 3 mm. and an average length of several centimeters.

In FIG. 3 there is plotted at A the polarization of a conventional negative electrode in a battery as described above, the corresponding values for a negative electrode according to the invention being given by graph B. The batteries represented by these two graphs had a rating of five ampere-hours and were discharged at two amperes at an ambient temperature of —30° C. It will be seen that the polarization in a battery with negative electrodes according to the invention rises much more slowly than that of a battery comprising conventional plates.

Similar results were obtained with electrodes incorporating silver turnings of the general configuration described.

It may be mentioned that further reduction in polarization at the negative electrodes, concurrently with similar improvement at the positive plates, was observed as the internal pressure of the electrode assembly was lowered to a fraction of the minimum value of 15 kg./dm.$^2$ recommended for conventional electrodes in accordance with the teachings of André Patent No. 2,594,713. Owing to the resiliency of the negative electrodes, no apparent decrease in storage capacity, maximum discharge rates and rechargeability occurred as a result of this lowering of pressure.

Although the invention has been described with reference to a specific embodiment, it is to be understood that the same may be adapted or modified in numerous ways without thereby departing from the scope of the appended claims.

I claim:

1. An electrode for a galvanic cell adapted to operate at low temperatures, comprising a body of compacted zinc oxide particles and a multiplicity of elastically compressible metal turnings distributed throughout said body in a quantity sufficient to impart compressive resilience to said body and to serve as an electrically conductive network therein.

2. An electrode for a galvanic cell adapted to operate at low temperatures, comprising a body of compacted zinc oxide particles and a multiplicity of elastically compressible turnings of a metal selected from the group which consists of silver and copper distributed throughout said body in a quantity sufficient to impart compressive resilience to said body and to serve as an electrically conductive network therein.

3. An electrode for a galvanic cell adapted to operate at low temperatures, comprising a body of compacted zinc oxide particles and a multiplicity of elastically compressible metal turnings distributed throughout said body in a quantity sufficient to impart compressive resilience to said body and to serve as an electrically conductive network therein, said turnings being coiled ribbons having a width of approximately 2 to 3 mm., a thickness of approximately 0.2 mm. and an average length on the order of several centimeters.

4. An electrode for a galvanic cell adapted to operate at low temperatures, comprising a body of compacted zinc oxide particles and a multiplicity of elastically compressible turnings of a metal selected from the group which consists of silver and copper distributed throughout said body in a quantity sufficient to impart compressive resilience to said body and to serve as an electrically conductive network therein, said turnings being coiled ribbons having a width of approximately 2 to 3 mm., a thickness of approximately 0.2 mm. and an average length on the order of several centimeters.

5. An electrode for a galvanic cell adapted to operate at low temperatures, comprising a body of compacted zinc oxide particles and a multiplicity of elastically compressible turnings of a metal selected from the group which consists of silver and copper distributed throughout said body in a quantity sufficient to impart compressive resilience to said body and to serve as an electrically conductive network therein, said turnings being coiled ribbons having a width of approximately 2 to 3 mm., a thickness of approximately 0.2 mm. and an average length on the order of several centimeters, said turnings and said particles being present in said body in a weight ratio on the order of 1:3.

References Cited in the file of this patent

UNITED STATES PATENTS

| | | |
|---|---|---|
| 2,561,943 | Moulton et al. | July 24, 1951 |
| 2,610,220 | Brennan | Sept. 9, 1952 |
| 2,832,813 | Peters | Apr. 29, 1958 |
| 2,865,974 | Scheverle et al. | Dec. 23, 1958 |
| 2,902,530 | Eisen | Sept. 1, 1959 |
| 2,931,846 | Cunningham et al. | Apr. 5, 1960 |
| 2,977,401 | Marsal et al. | Mar. 28, 1961 |